(12) United States Patent
Buchanan et al.

(10) Patent No.: US 6,578,905 B1
(45) Date of Patent: Jun. 17, 2003

(54) VEHICLE SLEEPER COMPARTMENT BUNK BED LADDER

(75) Inventors: Matthew Buchanan, Fort Wayne, IN (US); Joseph T. Penaloza, Fort Wayne, IN (US)

(73) Assignee: International Truck Intellectual Property Company, L.L.C., Warrenvillle, IL (US)

( * ) Notice: Subject to any disclaimer, the term of this patent is extended or adjusted under 35 U.S.C. 154(b) by 0 days.

(21) Appl. No.: 10/141,467

(22) Filed: May 8, 2002

(51) Int. Cl.⁷ .............................. B60R 27/00; E06C 9/12
(52) U.S. Cl. ................. 296/190.02; 296/24.1; 5/118; 182/96
(58) Field of Search ............. 182/96, 127; 296/190.02, 296/24.1; 5/118

(56) References Cited

U.S. PATENT DOCUMENTS

| | | | | |
|---|---|---|---|---|
| 295,127 A | * | 3/1884 | Miller ........................ | 182/96 |
| 4,046,081 A | | 9/1977 | Gutridge et al. | |
| 4,179,996 A | | 12/1979 | Gutridge et al. | |
| 4,258,828 A | | 3/1981 | Evans | |
| 5,031,563 A | * | 7/1991 | Matre ........................... | 5/118 |
| 5,046,582 A | | 9/1991 | Albrecht | |
| 5,339,920 A | * | 8/1994 | Eriksson ..................... | 182/96 |
| 5,697,470 A | | 12/1997 | Carle | |
| 5,788,011 A | * | 8/1998 | Kemmer et al. .............. | 182/96 |
| 6,273,494 B1 | * | 8/2001 | Beigel .................... | 296/190.02 |
| 6,340,071 B1 | | 1/2002 | Diekemper | |
| 6,457,559 B1 | * | 10/2002 | Schlueter et al. ........... | 182/159 |

* cited by examiner

*Primary Examiner*—D. Glenn Dayoan
*Assistant Examiner*—Greg Blankenship
(74) *Attorney, Agent, or Firm*—Jeffery P. Calfa; Neil T. Powell; Dennis Kelly Sullivan

(57) ABSTRACT

The invention provides a stowable ladder mechanism for an overhead bed or upper berth in a bunk bed. A horizontal linear guide is vertically spaced above a horizontal support surface and associated with a bed or berth. The rungs of the ladder are supported between two vertical uprights, one of which is fixed at one end of the berth and the second of which is coupled to the horizontal linear guide and translates across the horizontal support surface along one side of the bed. The plurality of rungs include swing sections mounted on hinges which hang vertically when the translatable vertical upright is positioned adjacent to the fixed vertical upright. When the translatable upright is positioned away from the fixed upright, the swing sections are supported in a horizontal position.

9 Claims, 7 Drawing Sheets

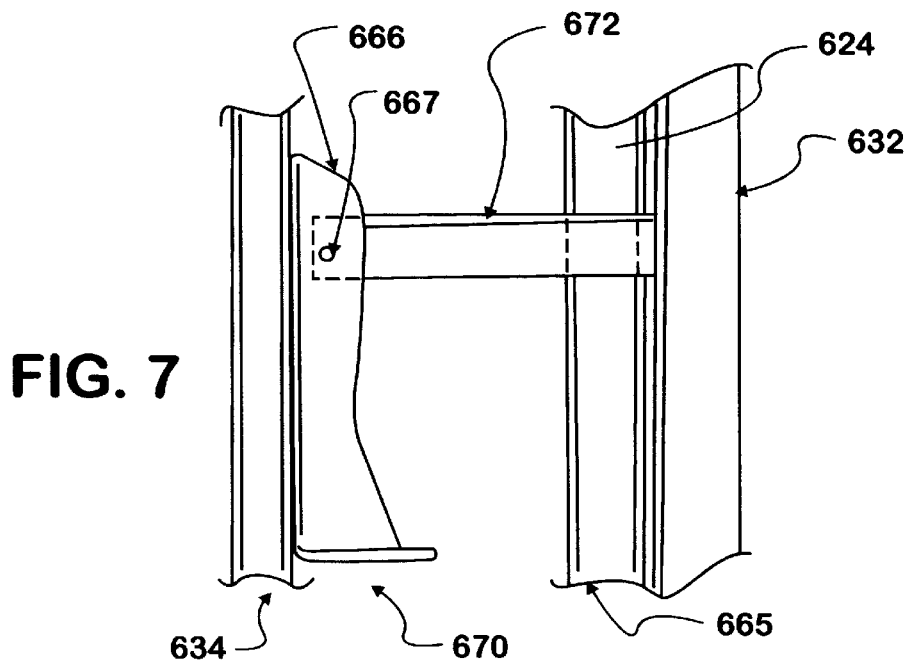
FIG. 7
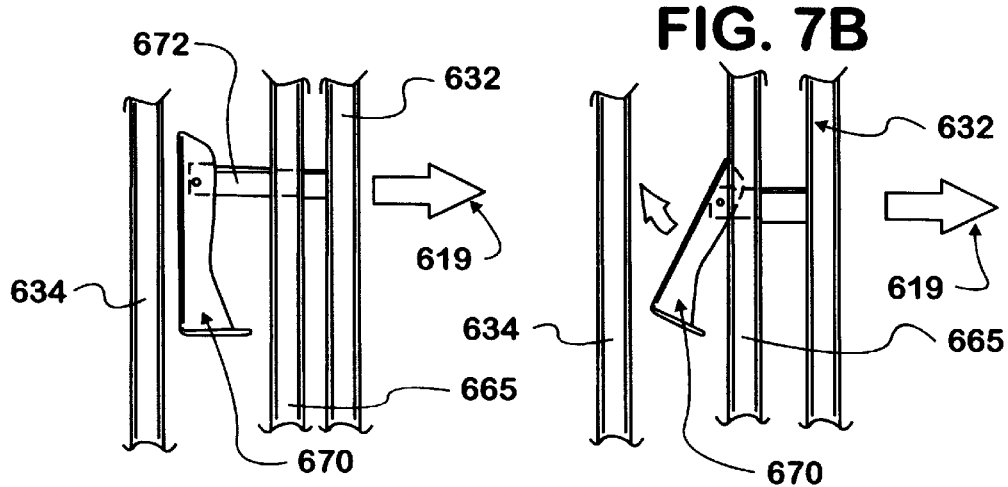
FIG. 7A  FIG. 7B
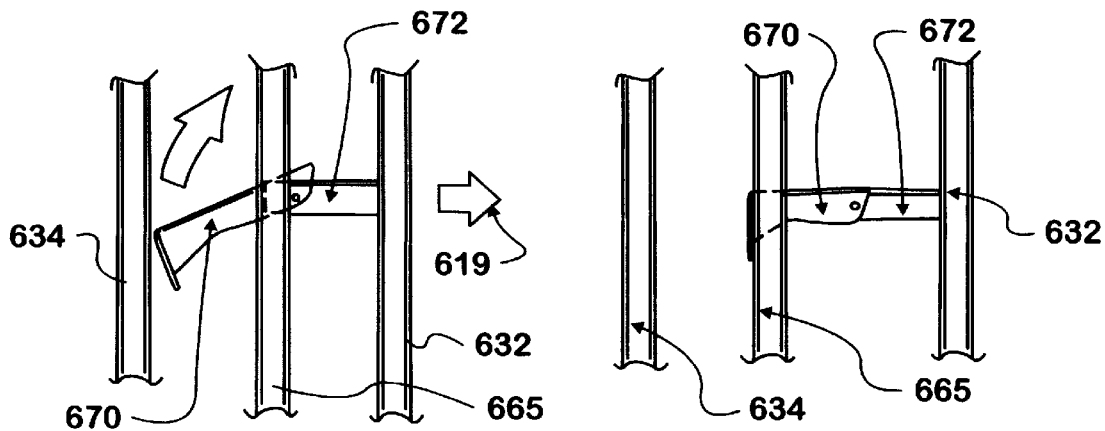
FIG. 7C  FIG. 7D

VEHICLE SLEEPER COMPARTMENT BUNK BED LADDER

BACKGROUND OF THE INVENTION

1. Field of the Invention

The present invention relates to sleeping compartments for vehicles, and more particularly to a stowable step ladder for such compartments which may be compacted for stowage.

2. Description of the Problem

Fold down overhead beds and bunkbeds are a common response to the desire to provide sleeping accommodations in a compartment with limited space, such as found on railroad passenger trains and in long haul trucks. Ease of access to the upper berth or berths of a bunkbed, or to a fold down overhead bed, requires a ladder of some sort. Due to constraints of space, access to the berths is typically limited to one side of the berth and, for the convenience of the passenger, the ladder is preferably located along the same side of the bed, although in some cases steps and hand grips are built into cabinets located at one end of the berth. For the convenience of the lower berth occupant, and to save space, where ladders are used, they are preferably stowable. Making the ladder stowable is aided by making the ladder foldable or collapsible.

Volvo in its VN 770 series trucks provides a stowable ladder based on a parallelogram mechanism. The design stows cleanly and tightly, but uses gravity to aid opening. This means that the device can open for a tired user more quickly than expected or can fall open if a passenger loses his grip while the vehicle is moving. What is desired is a stowable ladder which can be opened with one hand, but which does not make use of gravity to unfold.

SUMMARY OF THE INVENTION

According to the invention there is provided a stowable ladder mechanism for an overhead bed or an upper berth of a bunk bed. The ladder rests on a horizontal support surface. A horizontal linear guide is vertically spaced above the horizontal support surface and associated with a bed or berth. The rungs of the ladder are supported between two vertical uprights, one of which is fixed at one end of the berth and the second of which is coupled to the horizontal linear guide and translates across the horizontal support surface along one side of the bed. The plurality of rungs include swing sections mounted on hinges which hang vertically when the translatable vertical upright is positioned adjacent to the fixed vertical upright. When the translatable upright is positioned away from the fixed upright, the swing sections are supported in a horizontal position.

Two principal embodiments of the invention are taught. In a first embodiment, the swing sections of the rungs are anchored with respect to the fixed upright, and are interconnected by a tether which is attached to the free ends of the sections and, at one end of the tether, to the translatable upright. Lifting upwardly on the top one of swinging sections lifts all of the sections and pulls the translatable upright away from its stowed position. In the second described embodiment, the swing sections of the rungs are anchored on the translatable upright. Pulling the translating upright outwardly from its stowed position causes the swing sections of the rungs to ride upwardly on openings in the fixed upright, through which the swing sections are positioned, until they are raised, supported in a horizontal position on the fixed upright.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 7 is a partial view of an alternative locking embodiment.

FIG. 7A is the first of four drawings demonstrating the deployment of the alternative locking embodiment of FIG. 7.

FIG. 7B is the second of four drawings of the sequence beginning with FIG. 7A.

FIG. 7C is the third of four drawings of the sequence beginning with FIG. 7A.

FIG. 7D is the fourth of four drawings of the sequence beginning with FIG. 7A.

DETAILED DESCRIPTION OF THE INVENTION

Figure 1:
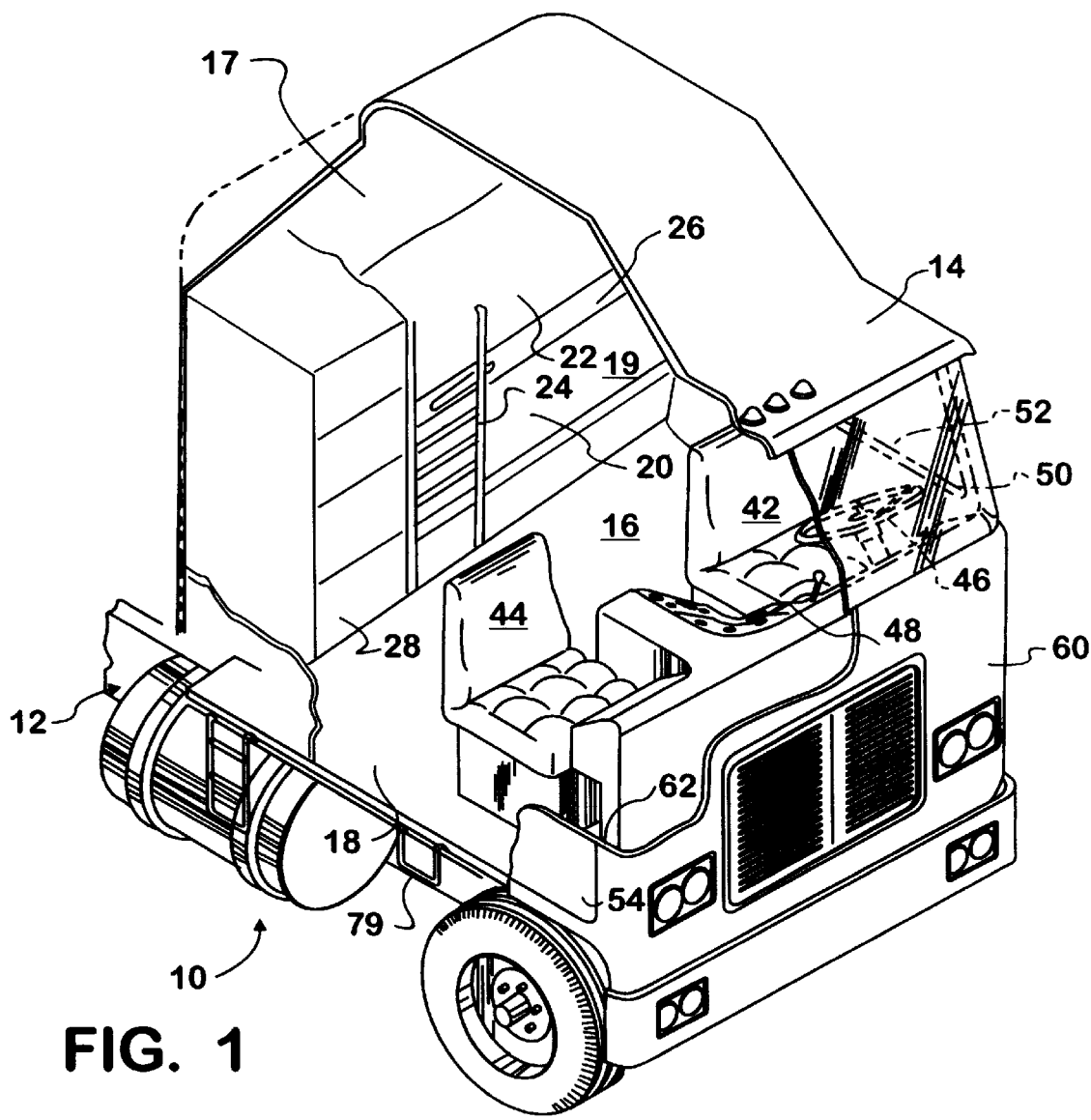
FIG. 1 is a perspective view of a truck cab partially cutaway to show a living compartment with a bunk bed and stowable ladder.

Referring now to the figures, in FIG. 1 is depicted a truck 10 having a cab 14 mounted on a pair of frame side rails 12 (passenger side only shown). Truck 10 is depicted as a cab over design, although the invention is equally applicable to other configurations. Cab 14 comprises four exterior sidewalls, including a front sidewall 60, a driver sidewall 50, a passenger sidewall 62 and an aft sidewall 17, which enclose an interior space 16. Interior space 16 is divided into an operator area forward and a living area aft. The operator area includes a driver station 42 having access to a steering wheel 46 and an instrument and control panel 48. The driver station 42 and passenger area 44 are positioned to good views through windshield 50 and to be next to doors 52 and 54 for easy egress from the vehicle. Fixed exterior ladders 79 located near the doors help with getting in and out of the vehicle.

A bunkbed 19 comprising a lower berth 20 and an upper berth 22 is located in the living area and occupies the rear most portion of interior space 16 against aft wall 17. One side of each of the berths is substantially flush against the interior face of aft wall 17 and the opposite major side of the berths open out into the interior space 16. A full height cabinet 28, resting on floor 18, is located at one end of berths 20 and 22. A stowable ladder 24, constructed in accord with either of the major embodiments of the present invention is located along the exposed major sides of the berths. As described below, ladder 24 opens up along a side rail 26 of upper berth 22.

Figure 2:
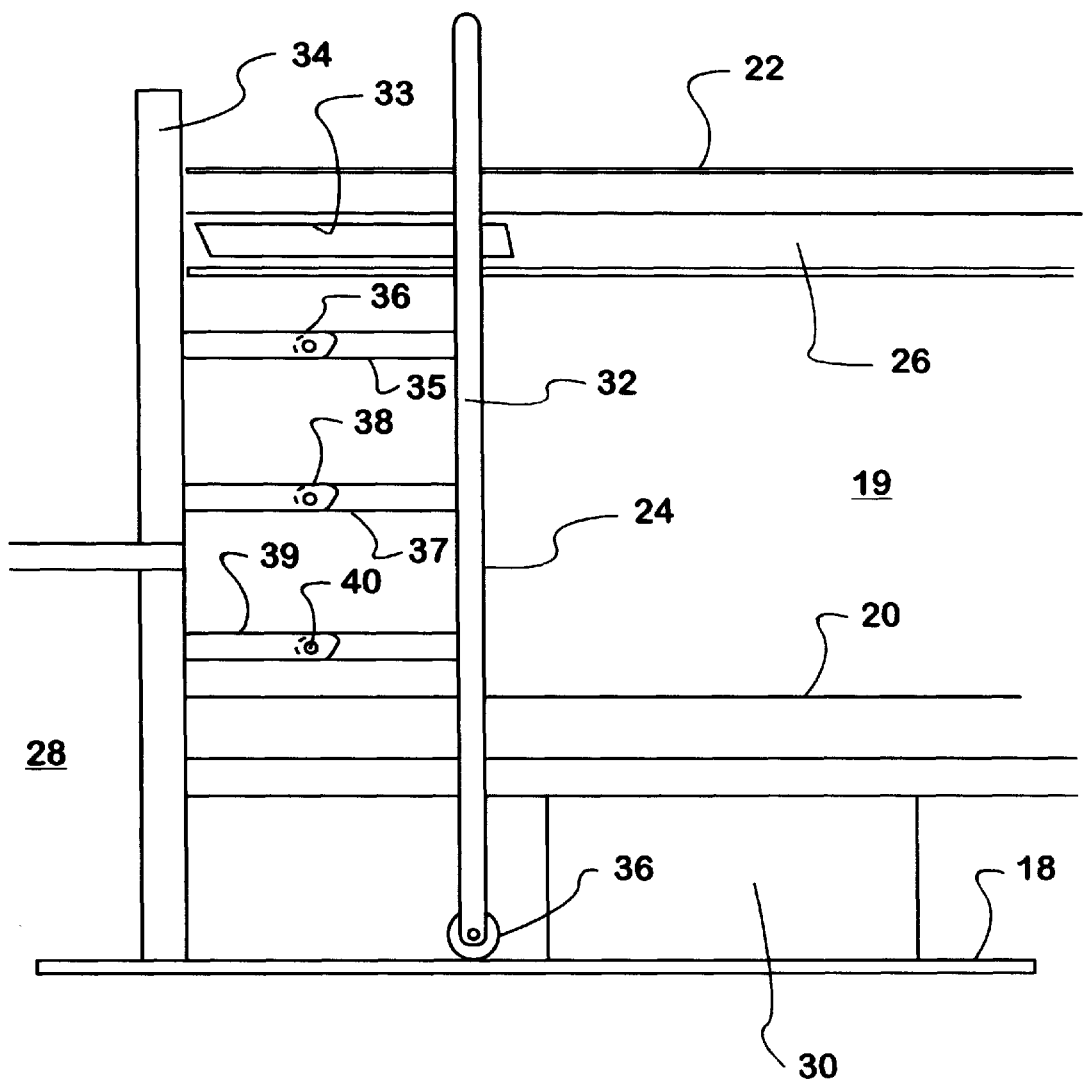
FIG. 2 is a plan view of a stowable ladder constructed in accordance with the invention.

FIG. 2 is a plan view of the bunkbed 19 and a fully deployed ladder 24. Lower berth 20 rests on stowage compartments 30. Ladder 24 opens to a position partially blocking access to the lower berth 20. Ladder 24 comprises a translatable vertical upright support leg 32 which is supported by floor 18, riding over the floor on a roller 36. Upright 32 is coupled into a horizontal guide 33 formed in side rail 26, which keeps the travel of the upright linear along the sides of the berths 20 and 22. A second upright 34 is positioned on cabinets 28 adjacent the ends of berths 20 and 22. Three rungs 35, 37 and 39 are supported between uprights 32 and 34. Rungs 35, 37 and 39 include hinges 36, 38 and 40, respectively, which allow a section of each rung to hang vertically when the ladder is collapsed for stowage. A second preferred embodiment of the invention is illustrated in the figure, however the description has so far been limited to features common to both embodiments. The vertical uprights used for supporting the rungs of the ladders are denoted by the numerals 32 and 34 for the second embodiment and 132 and 134 in the second embodiment. Rungs are similarly differentiated.

Figure 3:
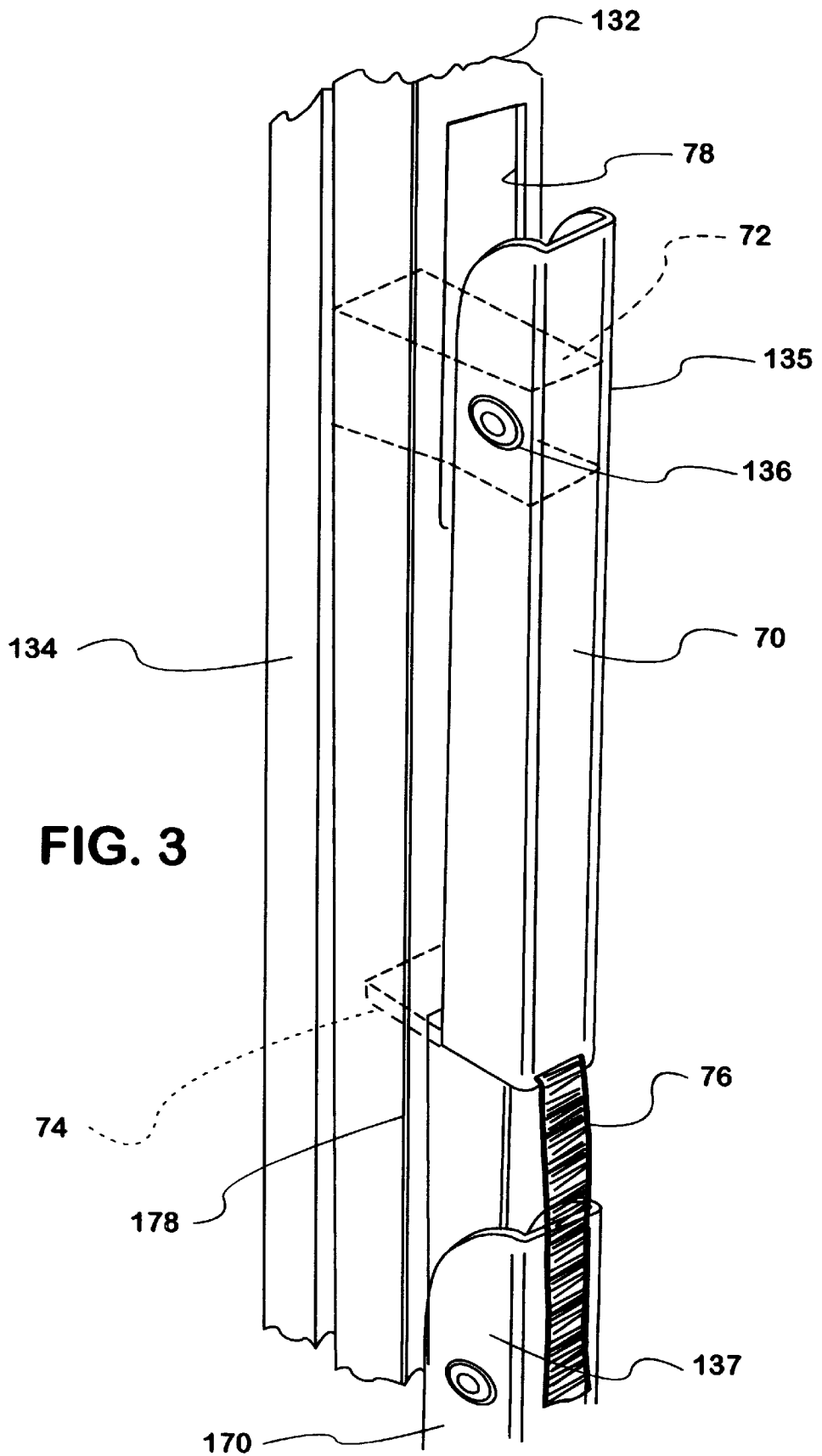
FIG. 3 is a perspective view of a rung in accordance with one embodiment of the invention.

FIG. 3 illustrates in detail rung 135, in accordance with a first embodiment of the invention. Translatable upright 132 is illustrated moved to its stowed position, directly adjacent fixed upright 134. Rung 135 (shown partially in phantom) extends from fixed upright 134 through an opening 78 in upright 132. Rung 135 comprises two major sections, an anchor section 72 and a swing or hinged section 70, connected near an end of each section on a pivot axle 36. An anchor section 72 is rigidly mounted to fixed upright 134 and extends horizontally therefrom toward opening 78.

When upright 132 is positioned adjacent to upright 134, anchor section 72 extends through opening 78 placing pivot axle 136, and swing section 70 entirely on the far side of upright 132 relative to upright 134. In this position, swing section 70 is unsupported and pivots downwardly on pivot axis 136 to a substantially vertical orientation parallel with translatable upright 132. The free or swinging end of swing section 70 terminates in a flange 74, which is partially inserted adjacent into an opening 178 adjacent the upper lip of the opening. Opening 178 is positioned below opening 78 on upright 132 and is provided for rung 137. When translatable upright 132 is positioned at its maximum extension away from upright 134, flange 74 catches against upright 132 below the lower lip of opening 78. Flange 74, and corresponding flanges on the remaining swing sections, limit the maximum travel of translatable upright 132 away from the fixed upright 134. In the expanded state of ladder 24, the lower lip of opening 78 supports the bottom of swing section 70 in a horizontal position aligned on anchor section 72, for use as a ladder rung 135.

Figure 4:
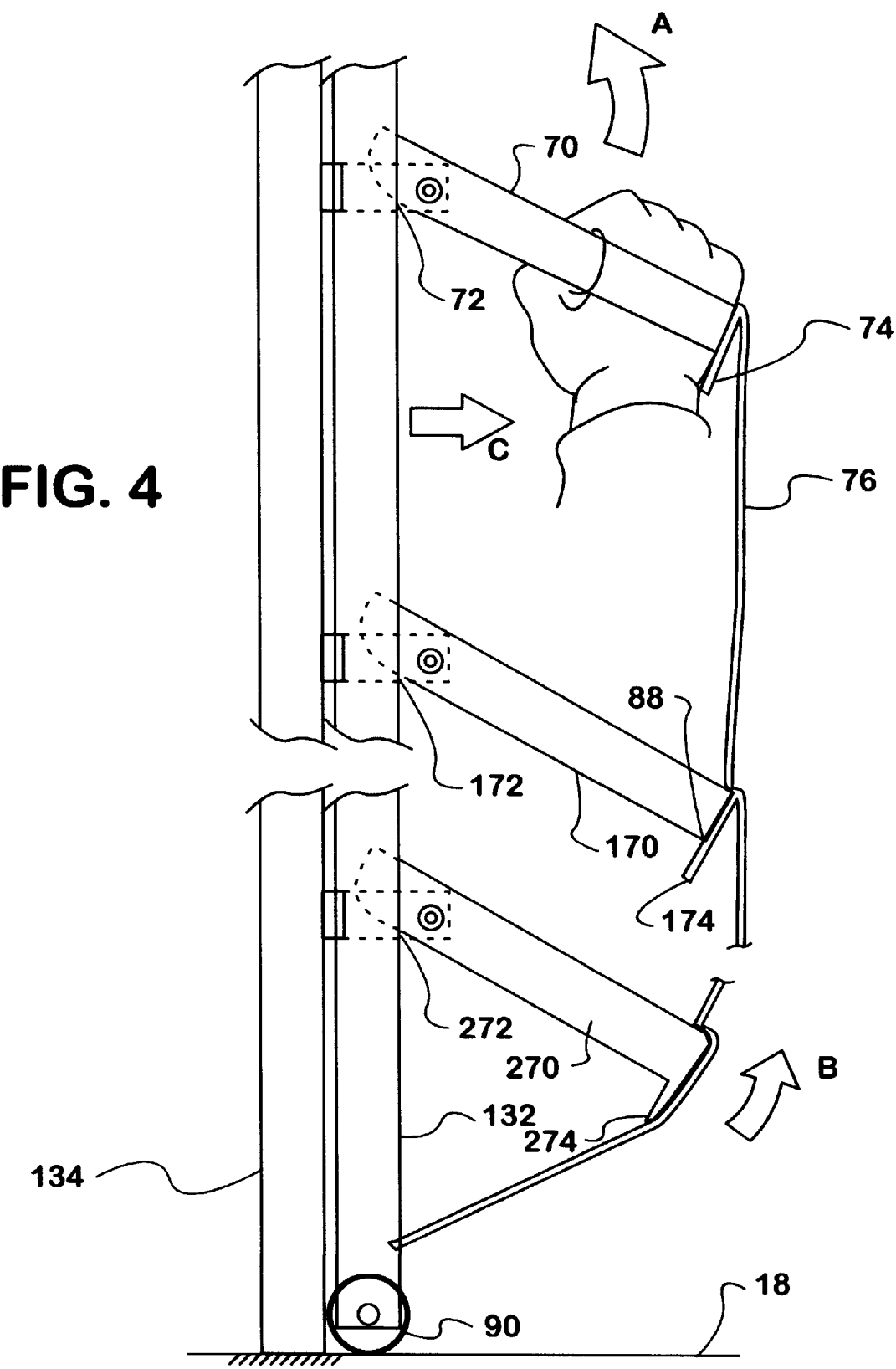
FIG. 4 is a plan view illustrating operation of the first embodiment of the invention.

Rung 135 is the topmost of a plurality of rungs and serves as the anchor for one end of a tether or flexible strap 76, which connects the ends of adjacent rungs. The function of tether 76 is better explained with reference to FIG. 4 where it may be seen that tether 76 is anchored at one end to swing section 70 and at the opposite end to a point below all of the remaining rungs and near the bottom of translatable upright 132. By grasping and lifting swing section 70 in the direction indicated by the arrow "A", swing sections 170 and 270 are also lifted as indicated by the arrow marked "B". By virtue of tether 76 being connected at one end to translatable upright 132, the upright is pulled outwardly in the direction indicated by arrow "C", moving on a roller 90 mounted to the bottom of the upright and which rides on floor 18. At the maximum extent of the travel of upright 132, notch 88 in swing section 170 catches the lower lip of opening 178, retaining the ladder 24 in its expanded state. After translatable upright 132 has passed pivot axis 136, upright 132 can be grasped and moved away from fixed upright 134.

Figure 5:
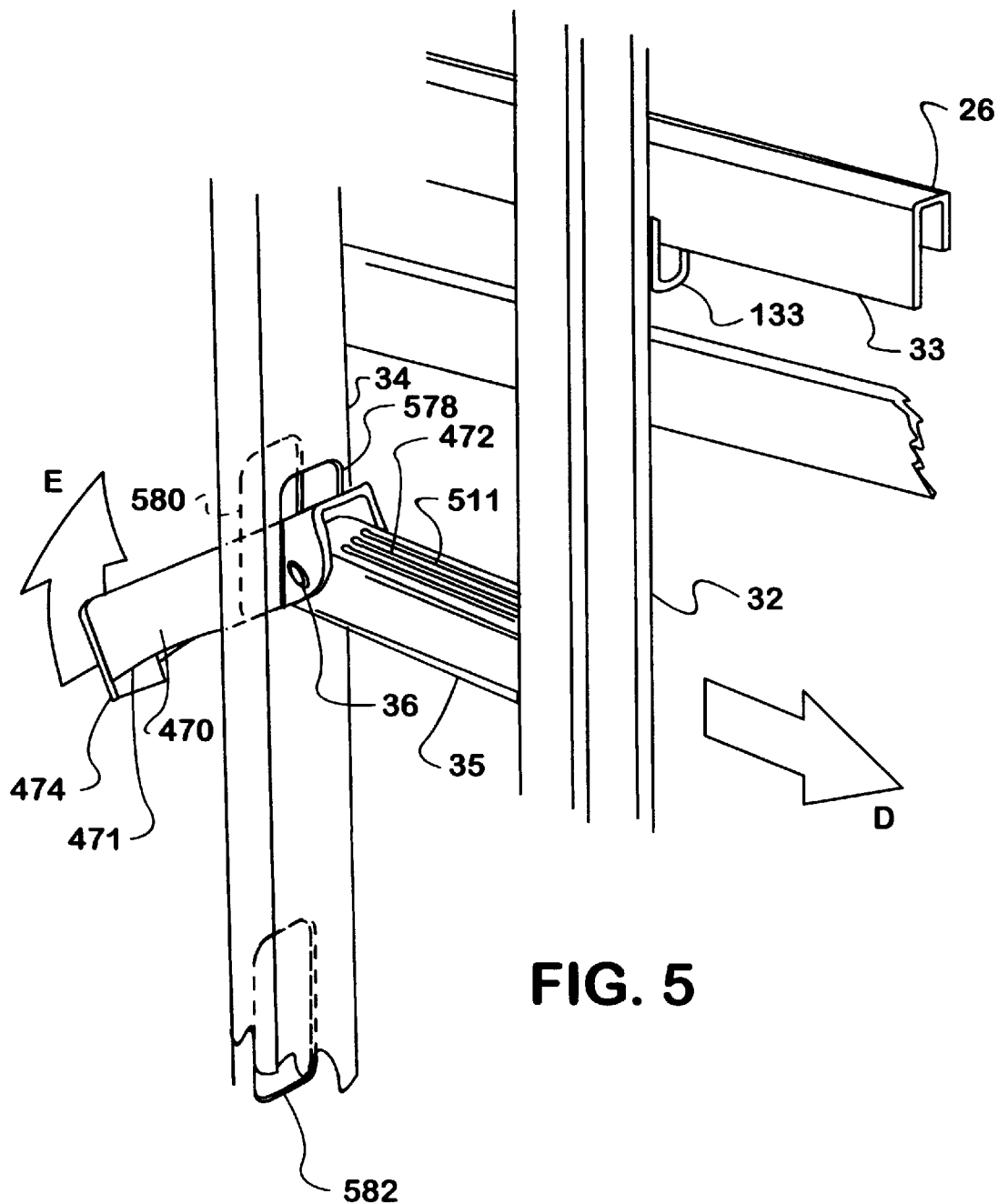
FIG. 5 is a perspective view of a rung in the second embodiment of the invention.

FIG. 5 illustrates a second embodiment of the invention in which rungs are anchored on translatable upright 32. One feature of the second embodiment common to both embodiments, but not illustrated in detail above, is the cooperation between the translatable upright 32 (or 132) on a berth siderail 26. A upwardly open C-shaped bracket 133 engages on lip of a channel 33 open in the side of berth side rail 26. The engagement of bracket 133 with channel 33 keeps translatable upright 32 close against rail 26. Coupling of upright 32 to berth side rail 26 can of course be accomplished in a number of different ways.

In the second embodiment, the anchor sections and the swing sections of the rungs are reversed, with the anchor sections being mounted on the translatable upright 32 and the swing sections extending away from the anchor sections toward the fixed position upright 34. Rung 35 is illustrated comprising an anchor section 472 mounted on translatable upright 32 oriented inwardly toward fixed upright 34. Swing section 470 extends through an opening in fixed upright 34, which is a hollow tube. The opening comprises two parts, a first shorter opening 578 through the face of upright 34 closer to upright 32 and a second, taller opening 580 on the face of upright 34 away from upright 34. The significant difference between openings 578 and 580 is that the lower lip of the latter opening is substantially below the lower lip for the former opening. The difference in heights between the lower lips of the two openings 578 and 580 gives the swing arm 470 a mechanical advantage while translating upright 32 moves away from fixed upright 34. The upper surface 511 of rung 35 may be grooved for traction purposes.

Figure 6:
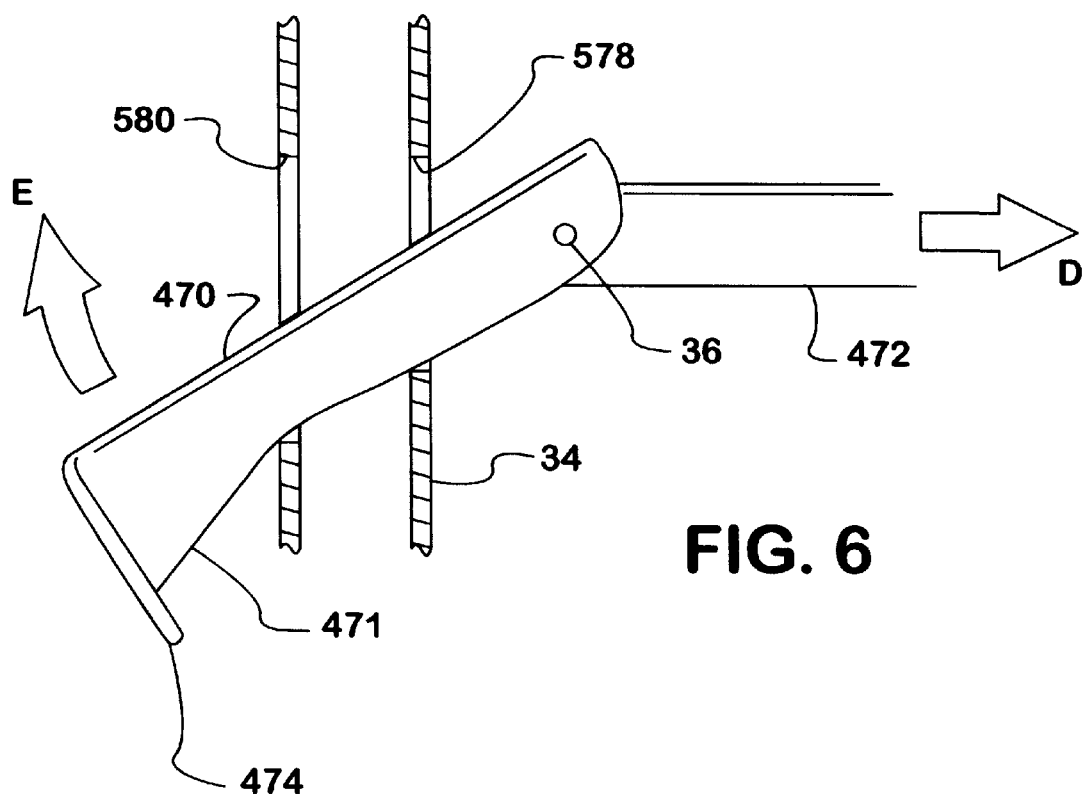
FIG. 6 is a plan view illustrating operation of the second embodiment.

Swing section 470 terminates in a flange 474. Swing section 470 hangs vertically adjacent to the fixed upright 34 when the ladder is fully stowed, in a manner similar to described for the first embodiment, with flange 474, disposed on the free end of the swing section, partially inserted into opening 582, near the upper lip of the opening. The embodiments differ in how the swing sections are brought to a horizontal position. As illustrated in FIG. 6, movement of translatable upright 32 away (in the direction of arrow "D") from fixed upright 34 pulls swing section 470, and the other swing sections, through openings 580 and 578, and brings the section toward a horizontal position (indicated by arrow "E"). As section 470 is pulled from the openings its lower surface first contacts the lower lip of opening 580. A ramp portion 471 extends for part of the length of section 470 along its bottom surface, so that as the bottom surface comes into contact with the lower lip of opening 578, the bottom surface of the swing section remains in contact with, and supported on the lower lips of both openings through fixed upright 34. Swing arm 470 substantially overlaps anchor section 472 on the outside thereof to insure that the rung formed by the arm and anchor section do not buckle under weight at hinge pin 36. A similar overlap can be seen in FIG. 3 in relation to the rung forming components of the first embodiment.

A ramp 471 is provided along the bottom edges of section 470 adjacent flange 474. Ramp 471 has a length approximately equal to the horizontal spacing between openings 578 and 580, with the slope of ramp 471 selected to account for the difference in the heights of the lower lips of the two openings. Thus swing arm 470 rests horizontally one translating upright 32 is deployed at its maximum extension for use.

The invention provides a stowable ladder which is highly compact when stowed. The ladder is mechanically simple, and minimizes problems with associated with accidental deployment during vehicle operation. No latch or strap is required to secure the ladder when stowed. Instead the weight of the ladder's own components, e.g. swing arms, keeps the ladder stowed. For the first embodiment, the strap interconnecting the swing arms also helps pull the translating vertical section outward to deploy the ladder. Compaction of the ladder for stowage is aided by spacing rungs vertically by a factor related to their length so that protruding portions of the swing sections of the rungs fit into the openings for immediately lower rungs when the ladder is stowed. For the strap assisted embodiment, the translating vertical section must pass the hinge point of the rungs in order to support the swing section horizontally. In either embodiment the ladder can be extended or retracted by a user in the upper bunk.

The swing section of the upper bunk ladder may move about while the vehicle is in motion. This can potentially cause extra noise and be a general annoyance to a driver or passenger of the vehicle. The swing section of the ladder can be immobilized. An alternative locking embodiment to accomplish this is shown in FIG. 7, and in a deploying sequence in FIGS. 7A to 7D. There is a translating vertical upright 632 that is next to a fixed vertical brace 634 when in the stowed position. In this condition the swing section 670 of the horizontal ladder rung hangs vertically and is braced by the fixed vertical brace 634. The swing section has an overlap portion 666. The overlap portion 666 and the remainder of the swing section 670 by being in contact with the fixed vertical brace 634 will prevent the swing section 670 from rotating about the hinge 667 when the ladder 624 is in the compact or stowed state. The hinge 667 connects the fixed anchor section 672 to the swing section 670. The fixed anchor section 672 fits through a fixed vertical upright 665. As the ladder 624 is initially deployed, the swing section 670 is initially vertical as shown in FIG. 7A. The fixed anchor section 672 moves horizontally in direction 619 through a slot in the fixed vertical upright 665. As the swing section 672 comes into contact with the fixed vertical upright 665, the swing section starts to rotate about the hinge 667, as shown in FIG. 7B. The distance between the vertical support brace 634 and the fixed vertical upright 665 is such that it allows just enough room for the swing section 672 to clear. In FIG. 7C, the swing section 672 is nearly horizontal. The swing section 672 is fully horizontal and locks up against the fixed vertical upright 665.

While the invention is shown in only one of its forms, it is not thus limited but is susceptible to various changes and modifications without departing from the spirit and scope of the invention.

What is claimed is:

1. A bunkbed for a truck sleeper unit, comprising:

a floor;

a lower bed and an upper bed stacked on the lower bed;

a side rail to the upper bed;

a fixed upright positioned at one end of the upper bed adjacent the side rail;

a translating upright supported from below by the floor and coupled to the side rail to move linearly along a side of the upper bed from a position adjacent the fixed upright to a position spaced from the fixed upright; and a plurality of rungs supported between the fixed upright and the translating upright when moved to the spaced position from the fixed upright and which at least partially collapse when the fixed upright and the translating upright are adjacent one another.

2. A bunkbed as set forth in claim 1, wherein each rung is segmented into an anchor section and a swing section, which depends from the anchor section at one end by a hinge.

3. A bunkbed as set forth in claim 2, wherein the anchor section of each of the plurality of rungs is mounted to be immobile with respect to the fixed upright and a tether connects the ends of the swing sections distal to the hinges and outside of translating upright relative to the fixed upright.

4. A bunkbed as set forth in claim 3, wherein the tether is anchored at one end to the translating upright.

5. A bunkbed as set forth in claim 4, wherein the translating upright comprises a plurality of openings corresponding to each rung and through which the rungs project.

6. A bunkbed as set forth in claim 2, wherein the anchor section of each rung is mounted on the translating upright and oriented in direction toward the fixed upright.

7. A bunkbed as set forth in claim 6, wherein there are a plurality of openings through the fixed upright and the rungs extend through the openings.

8. A bunkbed as set forth in claim 7, wherein when the translating upright is positioned adjacent the fixed upright, the anchor segments extend through the opening and the swing sections hang downwardly along side the fixed upright and when the translating upright is positioned away from the fixed upright the anchor sections are extracted from the openings and the swing section are rotated upwardly to an orientation parallel to the floor and supported adjacent their free ends by the fixed upright.

9. A bunkbed as set forth in claim 8, wherein the swing section terminate in flanges preventing their withdrawal from the openings in the fixed upright.

* * * * *